Feb. 7, 1961 N. L. WORRELL 2,970,396
PORTABLE AND VERSATILE MULTI-UNIT DISPLAY DEVICE
Filed Aug. 29, 1958 3 Sheets-Sheet 3
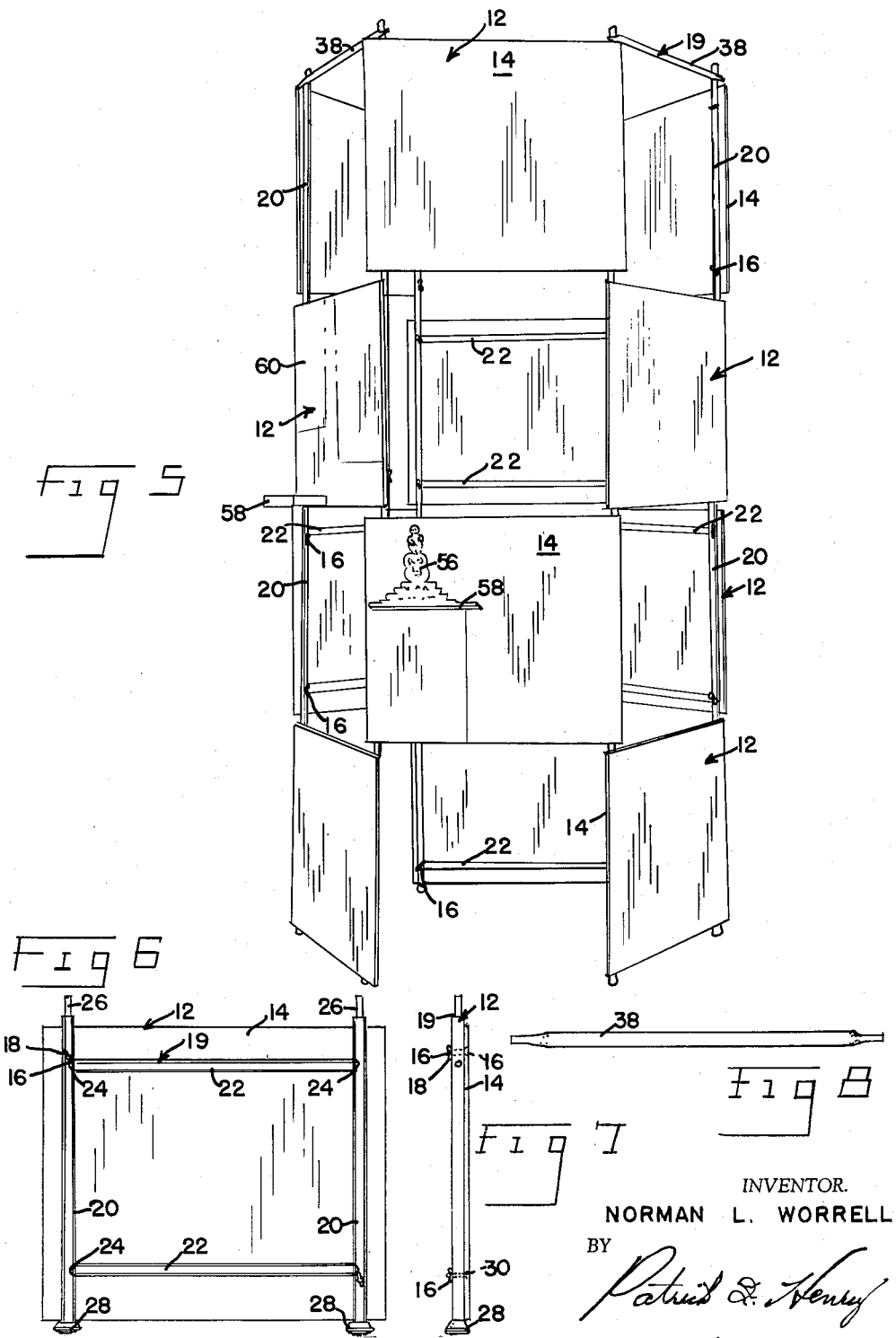
INVENTOR.
NORMAN L. WORRELL
BY United States Patent Office 2,970,396
Patented Feb. 7, 1961

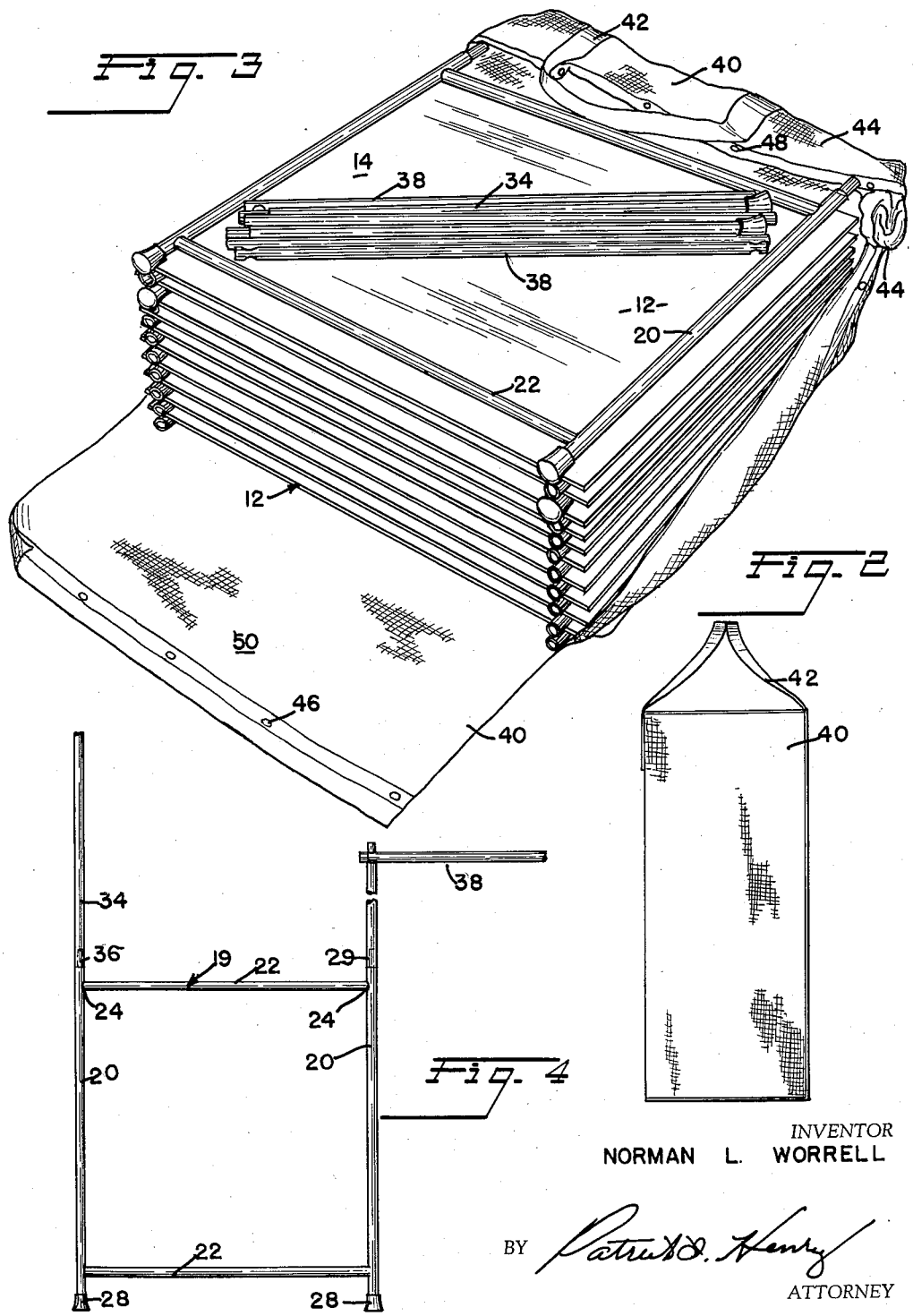

2,970,396
PORTABLE AND VERSATILE MULTI-UNIT DISPLAY DEVICE

Norman L. Worrell, 259 5th St. NW., Atlanta, Ga.

Filed Aug. 29, 1958, Ser. No. 758,077

4 Claims. (Cl. 40—125)

This invention relates to a portable and versatile multi-unit display device and especially to a display device composed of a plurality of flat panels supported for vertical display by a framework of lightweight frame members attachable together in various positions to permit many presentations of the flat panels.

The present device has particular application in the modern display field for visually communicating advertising material and ideas on flat panels and for displaying things in a compact fashion on a series of panels which may contain descriptive material. It is especially useful for travelling displays which are moved from location to location in short periods, often by airplane. It can be used, for example, to display and present visually the growth of American invention by illustrating on flat panels the written and pictorial material and explanation telling the story of the development of inventions and by actually including therewith on each or any of the panels models of the various inventions discussed. It can be used in the education field to show historical development such as the growth of writing instruments from crude chisels in stone to modern pens and pencils with actual specimens on the panels of this invention described in words and pictures on the panels themselves. The uses of this invention are unlimited.

Essentially the device is an open framework structure supporting itself on the floor by its own legs and supporting therewith a number of flat panels arranged in any order and sequence desired. It can be knocked down hurriedly or it can be re-arranged into a different pattern just as quickly. It is adapted to be constructed from lightweight aluminum tubing and pressed board or paper board panels, but, of course, other materials may be substituted.

Generally described, without the use of patent terminology and without any sort of restriction on the scope of this invention, the device is composed of and constructed from a series of identical panels of structural formation normally permanently joined together by matching sockets and horizontal spacer, connecting members. The main structural panel is a rectangular frame made from four lightweight, tubular members joined by means of standard "T-butt" connectors. Removably attached to the frame by wing nuts, screw rivets, or the like is a rectangular, lightweight fibreboard, plywood or similar panel with a flat, front surface on which advertising matter may be placed. One typical display is made from ten of these assembled panels connected as desired selecting from four vertical and six horizontal spacer tubes of lightweight tubing with open-ended female sockets to match the male plugs on the frame members. Two extra plain panels are included for versatility. All these members pack flat into a small stack which may be placed in a lightweight nylon case or may be tied together by straps or ropes.

A primary object of this invention is to provide a lightweight display framework which may be assembled, disassembled, and re-assembled into any number of different arrangements with flat panels on which advertising material may be placed.

There are many other objects and advantages of this invention that will appear from the following description taken in conjunction with the accompanying drawings, wherein:

Fig. 2 is a side elevation view of a nylon bag into which the disassembled device of Fig. 1 will fit.

Fig. 3 is a perspective view of the disassembled and stacked elements of the invention in Fig. 1 in the bag of Fig. 2 with the bag sides open.

Fig. 4 is a front elevation view of a basic rectangular frame of this invention with a vertical and horizontal spacer bar attached thereon for illustration.

Fig. 5 is an elevation view in perspective of the display device reassembled into another form of display.

Fig. 6 is a back elevation view of one of the basic panels of the device in Fig. 5.

Fig. 7 is a side elevation view of the panel in Fig. 6.

Fig. 8 is a plan view of one of the horizontal spacer tubes.

Figure 1:
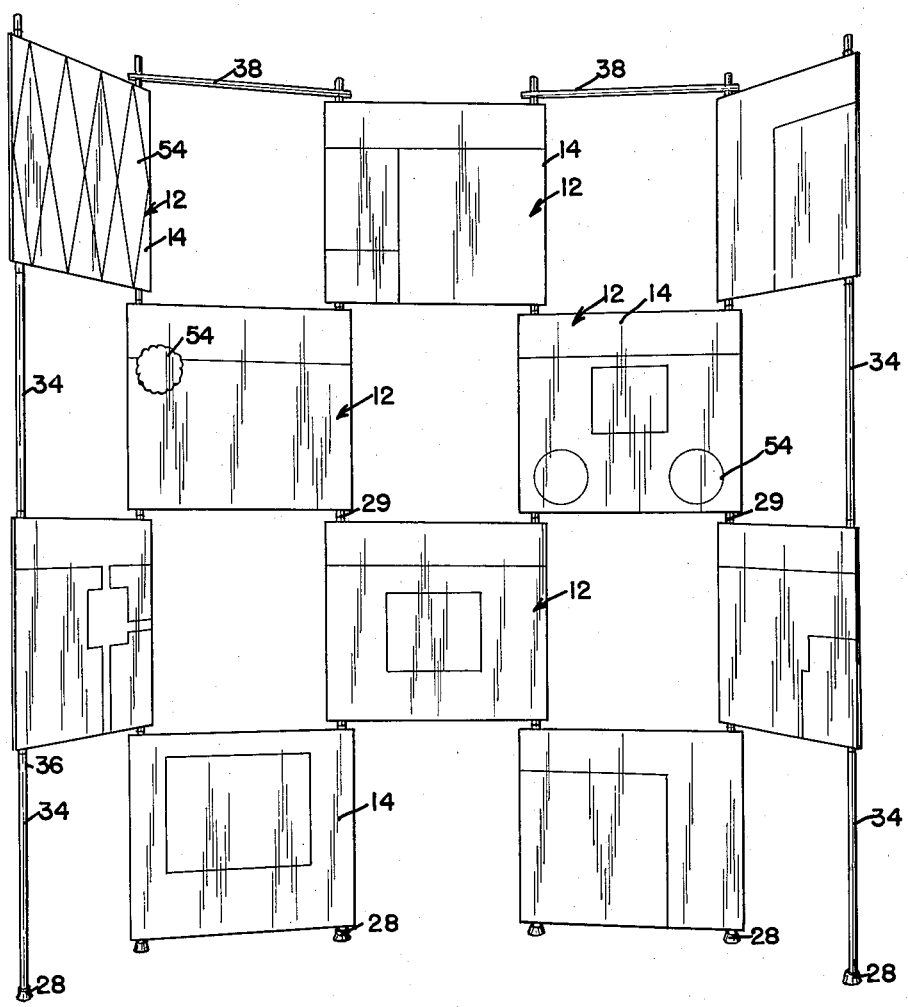
Fig. 1 is a front elevation view of an assembled display made by this invention.

In the preferred form of this invention, the structural members are of lightweight, tubular metal, such as aluminum. It is pointed out that other shapes of members may be used and of a different material. Referring to the device in Fig. 1, an open display stand device 10 is constructed from a plurality of flat panels or frame units 12 each having a flat panel board 14, of plywood, tempered hardboard, or similar material, thereon fastened in place by screws 16 with wing nuts 18. Each panel 12 is a structure unit and is normally permanently constructed as a rectangular open frame 19 of four members, two vertical members 20 and two horizontal members 22. Horizontal members 22 abut the sides of members 20 and connect thereto at joints 24 by conventional T butt connectors well known in the tubular aluminum field and the details of which are not shown. The upper end of each vertical member 20 is formed with a male plug end 26. Some of the panels 12 have rubber feet or ferrules 28 on the bottom ends of vertical members 20 for cushioned engagement with the floor. These rubber ferrules may be added to any member. The other panels 12 are formed with the open ends 29 serving as female plugs to receive the ends 26.

Panels 12 are normally permanently assembled with the front panel board 14 and affixed in place thereon by the countersunk screws 16 through the face of the board 14 and through the vertical, tubular members 20 which are held in place by wing nuts 18. These panels 12 may be combined together into one unitary display device by the use of spacer tubes. Vertical spacer tubes 34 are of open ended aluminum tubing or similar material with female ends 36 which fits onto the male plugs 26 on the vertical panel members. Horizontal spacer tubes 38 have through holes drilled adjacent each end thereof through which pass the male plugs 26 of the vertical panel members 20.

When disassembled, as in Fig. 3, the ten panel unit of Fig. 1 is stacked flat in a bundle with the panel boards 14 sandwiched between the panel frames 19 and with the vertical and horizontal spacer tubes, 34, 38 respectively, nested on the top panel board 14. A nylon, or other material, bag 40 has carrying straps 42 and one openable side 44 that has one side of snap fasteners 46 thereon. Matching with snaps 46 the other side 48 of the fasteners 46 so that the side 44 of the bag may be pulled back to expose the inside of the bag for inserting the entire stack of units therein, preferably by laying the bag open on its other side 49, as seen in Fig. 3. Then the bag side 44 is pulled in place and the top flap 50 of the bag snapped in place to close the bag with the carrying straps 42 formed as handles across the top flap 50, in the manner of Fig. 2.

In the operation of this device, versatility is inherent in the arrangement and each operator may create his own designs of relationship of panels 12, members 20, 22, 34 and other items. For example, in Fig. 1 is shown a ten panel exhibit with an open front and with the fronts of the panels 12 artistically painted by designs 54 and it may include whatever advertising copy is desired. The same display can be changed from day to day or week to week by a simple re-arrangement of panels.

From the device shown in Fig. 1, by disassembly of the panels 12 and other members, and with the addition of two extra boards 14, the new design of Fig. 5 is created. The Fig. 5 design is a closed exhibit of six sides and is very suitable for exhibiting objects, such as the old coin bank 56, attached on a ledge 58 attached to the front of panel board 14. In addition, pictorial matter 60 can be attached or printed on the board front and other artistic material and written copy can be shown. In this embodiment the panels 12 have been made to form a closed figure by connecting the vertical member 20 directly to the bottom of another vertical member 20 on another panel 12 and by interconnecting blank spots by horizontal spacers 38. The device has more than adequate stability, looks clean cut and neatly arranged, and presents several sides and much display material in a small area of floor space.

While I have shown and described in detail one preferred form of my invention and one different assembly thereof, it is important to note that one main object of this invention is its versatility and therefore other and further structures may be created from the parts shown herein and additional changes, alterations, modifications and substitutions may be made in the embodiments shown without departing from the scope of my invention defined in the appended claims.

I claim:

1. In a display device of the type described for presenting information visually, a plurality of lightweight frames each having elongated frame members connected together in a closed geometrical shape, a flat panel on each of said frames on which panel advertising and informational material may be exhibited, each of said frames having a connective means thereon complementary to and engageable with another connective means on another frame whereby each of said frames may be connected to another frame to form a series of frames connected together above the floor, vertical spacer members having connective means selectively connected to said frame members vertically therebetween to fill in between spaced panel members for completing vacant spaces therebetween, and horizontal spacer members having connective means selectively connective to said frame members horizontally therebetween to fill in between spaced panel members for completing vacant spaces therebetween, by virtue of which a display arrangement may be created from flat panels connected together in one unitary arrangement according to whatever relationship of panels is desired.

2. In a display device of the type described for presenting information visually, a plurality of lightweight panel units each having a flat panel formed in a closed, two dimensional geometrical shape and on which panel advertising or other information may be placed, each of said flat panel units having connective means thereon matchable with and engageable with like connective means on all other panels to connect any one of said panels to any other panel to form a series of panels connected together above the floor, vertical spacer members having connective means thereon selectively connective with said panel members therebetween for completing vacant spaces therebetween, and horizontal spacer members having connective means selectively connective with said panel members horizontally therebetween to fill in between, said panel units being attachable together as for example in an open framework with two or more panel units on the ground each supporting two panel units thereabove and with vertical spacers filling in and with said panel units in like manner supporting other panel units thereabove to whatever height is desired and in whatever length is desired forming an open display device of flat panels with open spaces therebetween, all of said units being detachable for re-arrangement in some other relationship such as building a closed shape wherein said panel units on one end are connected to the panel units on the other end by additional panel units joined with horizontal spacers to form a multi-sided display arrangement above the ground.

3. In an upright display device of the type described for showing visual information and being versatile for re-arrangement into different visual presentations, a plurality of basic display panel structures attachable together into one common, unitary form, each of said panel structures being constructed of a two dimensional frame composed of lightweight elongated frame members connected together defining a two dimensional geometrical shape and a flat panel member detachably attached on said two dimensional frame, each of said frames having a connective means thereon complementary to and attachable to a matching connective means any other frame whereby each frame can be connected to at least two other frames, vertical spacer members having connective means selectively connective to each of two said frame members vertically therebetween to fill in between spaced frames for completing vacant spaces therebetween, and horizontal spacer members having connective means selectively connectible to said frames horizontally therebetween to fill in between spaced panel members for completing vacant spaces therebetween, said frames being attachable together as in an open front framework with two or more frames on the ground each supporting two frames thereabove and with vertical spacers filling in and with said frames in like manner supporting other frames thereabove to whatever height is desired and in whatever length is desired forming an open display device of flat panels with open spaces therebetween, all of said frames being detachable for re-arrangement in some other relationship such as building a closed shape wherein said panels on one end are connected to the panels on the other end by additional panels and horizontal spacers to form a multi-sided display arrangement above the ground.

4. In an upright display device of the type described for exhibiting information and being versatile for re-arrangement into different visual presentations, a plurality of basic display panel structures attachable together into one common, unitary form, each of said panel structures being constructed of a lightweight two dimensional quadrilateral frame composed of lightweight, elongated frame members connected together defining a two dimensional quadrilateral shape, a flat panel member of a shape corresponding to said frame detachably attached to said frame, each of said frames having an open socket on the bottom thereof and a plug on the top thereof, said socket and plug on each frame being complementary to all plugs, sockets and respectively on all other panel frames whereby said frames may be connected together by the socket of one receiving the plug of another by virtue of which panels frames may be stacked one on the other, vertical spacer members having socket portions and plug portions attachable on any of said frames to attach one frame member across an open space to another frame member, horizontal spacer members having socket portions connective with any of said panel frame members to attach one frame member across an open space to another frame member, said panels being attachable together first in an open frame with two or more panels on the ground supporting two panels thereabove with the plug of one frame in the socket of another frame and with vertical spacers filling in the space to the ground, and with additional panels supported above said last named panels to whatever height is desired and in whatever length of panels is preferred forming an open display of flat panels with open spaces therebetween, all of said panels being detachable for re-arrangement in some other relationship such as a closed shape wherein said panels on one end are connected to panels on the other end by additional panels and horizontal spacers to form a multi-sided display arrangement above the ground.

References Cited in the file of this patent

UNITED STATES PATENTS

| | | |
|---|---|---|
| 1,172,355 | Guest | Feb. 22, 1916 |
| 1,359,659 | Beans | Nov. 23, 1920 |

FOREIGN PATENTS

| | | |
|---|---|---|
| 746,073 | Great Britain | Mar. 7, 1956 |